US012681557B2

(12) United States Patent
Xi et al.

(10) Patent No.: US 12,681,557 B2
(45) Date of Patent: Jul. 14, 2026

(54) SYSTEM-ON-CHIP, ENVIRONMENTAL MONITORING DEVICE COMPRISING THE SYSTEM-ON-CHIP, AND CONTROL SYSTEM

(71) Applicant: Gulf Security Technology Company Limited, Qinhuangdao (CN)

(72) Inventors: Jie Xi, Shanghai (CN); Benliang Li, Qinhuangdo (CN); Hongliang Lei, Qinhuangdao (CN); Fei Ye, Shanghai (CN); Zhanlin Yang, Qinhuangdao (CN); Maoqing Yang, Qinhuangdao (CN); Liping Wang, Shanghai (CN)

(73) Assignee: KIDDE FIRE PROTECTION, LLC, Bradenton, FL (US)

( * ) Notice: Subject to any disclaimer, the term of this patent is extended or adjusted under 35 U.S.C. 154(b) by 159 days.

(21) Appl. No.: 18/497,584

(22) Filed: Oct. 30, 2023

(65) Prior Publication Data

US 2024/0143064 A1     May 2, 2024

(30) Foreign Application Priority Data

Oct. 31, 2022     (CN) .......................... 202211344995.4

(51) Int. Cl.
G06F 1/3296          (2019.01)
G06F 13/36          (2006.01)

(52) U.S. Cl.
CPC ............ G06F 1/3296 (2013.01); G06F 13/36 (2013.01)

(58) Field of Classification Search
CPC ................................ G06F 1/3296; G06F 13/36
USPC ........................................................... 713/323
See application file for complete search history.

(56) References Cited

U.S. PATENT DOCUMENTS 4,257,098  A  *  3/1981  Lacy ....................... G01V 1/223
4,860,201  A  *  8/1989  Stolfo ............... G06F 16/90348
                                              707/E17.104
5,818,607  A  *  10/1998  Nakamura ........... H04N 1/4175
                                              358/426.05
5,938,771  A  *  8/1999  Williams .............. G06F 1/3209
                                              713/323

(Continued)

OTHER PUBLICATIONS

European Search Report for Application No. 23207144.9, Issued Mar. 21, 2024, 6 Pages.

*Primary Examiner* — Paul R. Myers
(74) *Attorney, Agent, or Firm* — CANTOR COLBURN LLP

(57)                    ABSTRACT

A system-on-chip in accordance with an aspect of the present application comprises: a communication interface connected with an external bus; a hardware decoder connected with the communication interface; and a microprocessor core connected with the communication interface and the hardware decoder, wherein the hardware decoder is configured to receive, via the communication interface, a signal frame transmitted on the external bus, to extract a receiver address from the signal frame as received and to send a wake-up command to the microprocessor core upon determining that a receiver of the signal frame is the system-on-chip, wherein the microprocessor core is configured to remain in a sleep mode until the wake-up command is received, and to perform an operation specified by a control command contained in the signal frame in response to the wake-up command.

10 Claims, 5 Drawing Sheets

(56)                References Cited

U.S. PATENT DOCUMENTS

| | | | | |
|---|---|---|---|---|
| 6,047,378 A * | 4/2000 | Garrett | G06F 1/3209 | 713/320 |
| 6,052,739 A * | 4/2000 | Bopardikar | G06F 9/4812 | 719/321 |
| 6,154,832 A * | 11/2000 | Maupin | G06F 9/4812 | 712/228 |
| 6,317,847 B1 * | 11/2001 | Haubursin | G06F 11/3648 | 714/E11.212 |
| 6,366,957 B1 * | 4/2002 | Na | G06F 1/3203 | 709/229 |
| 7,370,352 B2 * | 5/2008 | Minnick | H04L 63/0485 | 713/160 |
| 8,339,188 B1 * | 12/2012 | Silver | H10D 64/035 | 327/543 |
| 9,229,518 B1 * | 1/2016 | Pannell | G06F 1/3287 | |
| 9,749,958 B1 * | 8/2017 | Segev | H04W 52/0229 | |
| 2002/0083351 A1 * | 6/2002 | Brabenac | H04L 43/028 | 713/300 |
| 2004/0190552 A1 * | 9/2004 | Kim | H04L 1/005 | 370/469 |
| 2005/0025067 A1 * | 2/2005 | Jones | H04L 69/321 | 370/254 |
| 2005/0079880 A1 * | 4/2005 | Donner | H04Q 9/00 | 455/414.1 |
| 2006/0173970 A1 * | 8/2006 | Pope | G06F 13/28 | 709/216 |
| 2007/0076683 A1 * | 4/2007 | Chung | H04W 52/0216 | 370/350 |
| 2008/0080500 A1 * | 4/2008 | Shimura | H04L 63/029 | 726/4 |
| 2009/0077404 A1 * | 3/2009 | Herring | G06F 1/3287 | 713/323 |
| 2010/0205467 A1 * | 8/2010 | Park | G06F 1/3234 | 713/320 |
| 2010/0318822 A1 * | 12/2010 | Scandurra | G06F 1/3203 | 713/400 |
| 2011/0059787 A1 * | 3/2011 | Crossman | G07F 17/34 | 463/20 |
| 2011/0138044 A1 * | 6/2011 | Bailey | H04L 12/12 | 709/225 |
| 2011/0213992 A1 * | 9/2011 | Satsangi | G06F 1/3209 | 713/300 |
| 2011/0248865 A1 | 10/2011 | Hong et al. | | |
| 2012/0210112 A1 * | 8/2012 | Suganami | H04L 12/12 | 713/323 |
| 2012/0257655 A1 | 10/2012 | Muth | | |
| 2013/0106616 A1 * | 5/2013 | Gustafsson | H04Q 9/00 | 340/870.02 |
| 2013/0130636 A1 * | 5/2013 | Ungan | H04B 1/16 | 455/230 |
| 2013/0155279 A1 * | 6/2013 | Khan | H04N 25/00 | 348/E5.031 |
| 2014/0245052 A1 | 8/2014 | Lorenz et al. | | |
| 2015/0200789 A1 | 7/2015 | Jiang et al. | | |
| 2017/0005957 A1 * | 1/2017 | Han | H04L 51/10 | |
| 2017/0024243 A1 * | 1/2017 | Kishan | G06F 1/3287 | |
| 2018/0063788 A1 * | 3/2018 | Yang | H04W 12/108 | |
| 2019/0090189 A1 * | 3/2019 | Story | H04W 52/028 | |
| 2019/0132796 A1 * | 5/2019 | Huang | H04W 40/244 | |
| 2019/0191375 A1 * | 6/2019 | Cheng | H04L 1/1607 | |
| 2019/0220288 A1 | 7/2019 | Jang et al. | | |
| 2022/0131410 A1 * | 4/2022 | Benbuk | H02J 50/402 | |
| 2023/0013473 A1 * | 1/2023 | Schroder | H04L 49/901 | |

* cited by examiner

_50_

SYSTEM-ON-CHIP, ENVIRONMENTAL MONITORING DEVICE COMPRISING THE SYSTEM-ON-CHIP, AND CONTROL SYSTEM

TECHNICAL FIELD

The present application relates to signal processing technology and environmental monitoring technology and, in particular, to a system-on-chip, an environmental monitoring device comprising the system-on-chip, and a control system comprising the environmental monitoring device.

BACKGROUND

Two-wire fire buses are widely used in the fire alarm field. In a typical application scenario, a smoke detector, which is an IoT node, is connected with a fire control panel with two wires, one of which is used to transmit data and power, and the other is grounded to provide a reference potential. A microprocessor core within the smoke detector continuously monitors the general purpose input/output port (GPIO). When the microprocessor core detects a rising edge of a voltage level, it will continuously measure the voltage level and decode a signal for a subsequent set period of time (e.g., several microseconds). Further, the microprocessor core will perform various operations based on a control command obtained by decoding.

Using low specification components within node devices is an effective way to reduce the overall cost of the system, but this is constrained by the processing capability requirements of the microprocessor core. In addition, as the number of nodes increases, reducing the energy consumption of the devices has become an urgent issue that needs to be addressed.

SUMMARY

According to an aspect of the present application, there is provided a system-on-chip, comprising:
- a communication interface connected with an external bus;
- a hardware decoder connected with the communication interface; and
- a microprocessor core connected with the communication interface and the hardware decoder,
- wherein, the hardware decoder is configured to receive, via the communication interface, a signal frame transmitted on the external bus, to extract a receiver address from the received signal frame and to send a wake-up command to the microprocessor core upon determining that a receiver of the signal frame is the system-on-chip,
- wherein, the microprocessor core is configured to remain in a sleep mode until the wake-up command is received, and to perform an operation specified by a control command contained in the signal frame in response to the wake-up command.

Optionally, in the system-on-chip, the microprocessor core is further configured to enter a sleep state again after completing the operation specified by the control command.

Optionally, in the system-on-chip, the wake-up command is an interrupt signal sent to the microprocessor core by the hardware decoder.

Optionally, in the system-on-chip, the microprocessor core is configured to access the hardware decoder in response to the interrupt signal to read the control command in the signal frame.

Optionally, in the system-on-chip, the hardware decoder comprises:
- a data buffer connected with the microprocessor core via an internal bus;
- a data receiving unit connected with the communication interface and the data buffer, the data receiving unit is configured to receive the signal frame from the external bus and, upon determining that a receiver of the signal frame is the system-on-chip, on the one hand store data of the signal frame to the data buffer and, on the other hand, send the interrupt signal to the microprocessor core to instruct the microprocessor core to read the data stored in the data buffer.

Further, optionally, in the system-on-chip, the hardware decoder further comprises a register array connected with the data receiving unit and connected with the microprocessor core via the internal bus, the register array is configured to perform a configuration operation on the data receiving unit in accordance with configuration information from the microprocessor core.

Optionally, in addition to one or more of the above features, in the system-on-chip, the data receiving unit is configured to store the data of the signal frame to the data buffer in the order of a first-in-first-out queue, and the register array outputs the configuration information from the microprocessor core to the data receiving unit in the order of a first-in-first-out queue.

Optionally, in the system-on-chip, the external bus is a two-wire fire bus.

Optionally, in the system-on-chip, the specified operation comprises at least one of the following: generating a message about an environmental state, reading configuration information in the control command, configuring the system-on-chip based on the configuration information and updating a computer program executed by the microprocessor core.

According to another aspect of the present application, there is provided an environmental monitoring device, comprising:
- a sensing unit configured to acquire an environmental state; and
- the system-on-chip as described above.

Optionally, the environmental monitoring device is one of the following: a smoke detection device, a heat detection device, a decibel meter, an electric/magnetic field detection device, a multifunction sensor, and a light intensity detection device.

According to another aspect of the present application, there is provided a control system, comprising:
- at least one environmental monitoring device as described above; and
- a control unit connected with the environmental monitoring device via an external bus.

Optionally, in the control system, the environmental monitoring device sends to the control unit an image data frame or an audio data frame about an environmental state.

DESCRIPTION OF THE DRAWINGS

The above and/or other aspects and advantages of the present application will be clearer and more easily understood from the following description of various aspects in conjunction with the accompanying drawings, in which the same or similar elements are denoted by the same reference numerals. The accompanying drawings include.

DETAILED DESCRIPTION

The present application is described more fully below with reference to the accompanying drawings, in which illustrative embodiments of the application are illustrated. However, the present application may be implemented in different forms and should not be construed as limited to the embodiments presented herein. The presented embodiments are intended to make the disclosure herein comprehensive and complete, so as to more comprehensively convey the protection scope of the application to those skilled in the art.

In this specification, terms such as "comprising" and "including" mean that in addition to units and steps that are directly and clearly stated in the specification and claims, the technical solution of the application does not exclude the presence of other units and steps that are not directly or clearly stated in the specification and claims.

Unless otherwise specified, terms such as "first" and "second" do not indicate the order of the units in terms of time, space, size, etc., but are merely used to distinguish the units.

In accordance with an aspect of the present application, a hardware decoder is utilized in a system-on-chip to decode a signal frame received from an external bus and to wake up a microprocessor core to perform a corresponding operation only when it is determined that a destination address of the signal frame points to a local device. In other words, the microprocessor core will remain in a sleep state until awakened by the hardware decoder and then enters the sleep state again after completing the operation.

Compared with a soft decoding method based on microprocessor core, the above-described hard decoding method can bring at least the following beneficial effects:

First, due to the introduction of the hardware decoder independent of the microprocessor core, it is possible to wake up the microprocessor core only when a receiver of a signal frame on an external bus is a local device. Although the operation of the hardware decoder consumes an amount of energy, it is much smaller compared to the energy consumption of the microprocessor core, thereby reducing the total amount of the energy of the device. Second, since the soft decoding method is no longer required, the demand for memory resources (for storing soft decoding program code and temporary data during soft decoding) is correspondingly reduced. In addition, the processing performance requirements of the microprocessor core can also be reduced (e.g., a lower clock signal frequency may be used) when the decoder function is not required. In addition, the above-described hardware decoding method improves the data throughput capability, making high-speed data communication between the system-on-chip and an external device (e.g., a control panel) possible.

Figure 1:
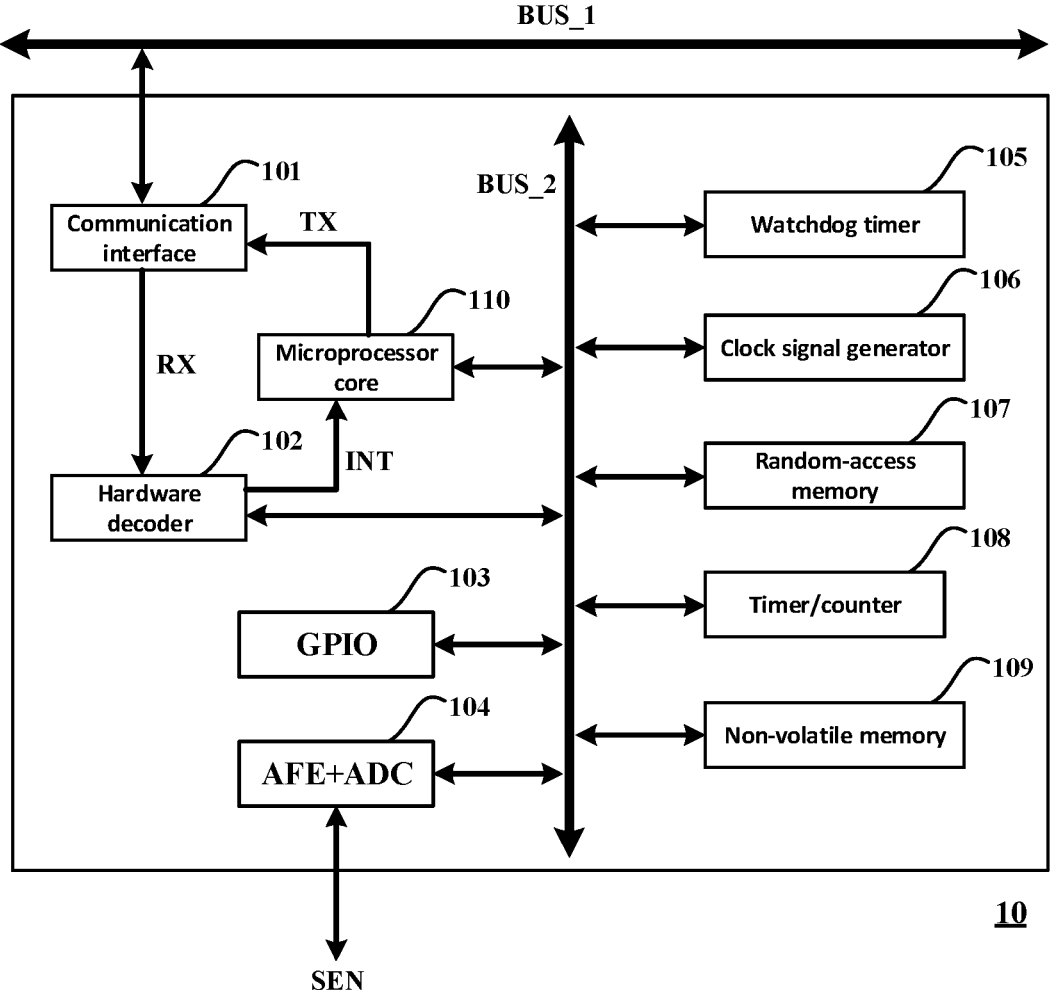
FIG. 1 is a schematic diagram of an architecture of a system-on-chip in accordance with some embodiments of the present application.

FIG. 1 is a schematic diagram of an architecture of a system-on-chip in accordance with some embodiments of the present application.

A system-on-chip 10 shown in FIG. 1 includes a communication interface 101, a hardware decoder 102, a general-purpose input/output port (GPIO) 103, an analog signal processing unit 104, a watchdog timer 105, a clock signal generator 106, a random-access memory (RAM) 107 (dynamic random-access memory), a timer/counter 108, a non-volatile memory 109 (e.g., read-only memory or erasable memory), and a microprocessor core 110. Exemplarily, the hardware decoder 102, the general-purpose input/output port (GPIO) 103, the analog signal processing unit 104, the watchdog timer 105, the clock signal generator 106, the random-access memory (RAM) 107, the timer/counter 108, the non-volatile memory 109 and the microprocessor core 110 are connected via an internal bus BUS_2 to communicate with each other.

Referring to FIG. 1, the communication interface 101 is connected to an external bus BUS_1 (e.g., a two-wire fire bus) to establish a communication connection with an external device. On the other hand, the communication interface 101 is also connected with the hardware decoder 102 and the microprocessor core 110. Exemplarily, the communication interface 101 comprises an adapter circuit that performs a voltage conversion operation to convert a voltage of the external bus BUS_1 (e.g., 24V) to an operating voltage (e.g., 3.3V) that is suitable for the internal units of the system-on-chip, and vice versa.

The hardware decoder 102 may have one or more of the features described above. For example, the hardware decoder 102 may be configured to receive a signal frame RX transmitted on the external bus BUS_1 via the communication interface 101, parse the signal frame RX to extract a receiver address and a control command as the data part of the signal frame, and determine whether a receiver of the signal frame RX is the system-on-chip 10 by an address comparison and, send a wake-up command to the microprocessor core 110 upon determining that the receiver is the system-on-chip 10.

In some embodiments, the microprocessor core 110 is awakened by sending an interrupt signal INT as a wake-up command by the hardware decoder 102 to the microprocessor core 110. The microprocessor core 110 accesses the hardware decoder 102 in response to the interrupt signal INT to read the control command in the signal frame RX.

In some embodiments, the microprocessor core 110 will always remain in a sleep mode unless the wake-up command is received; furthermore, the microprocessor core 110 will perform an operation specified by a control command contained in the signal frame RX after receiving a wake-up command. Optionally, the microprocessor core is further configured to enter a sleep state again after completing the operation specified by the control command. Examples of the specified operations include, but are not limited to, generating a message about an environmental state, reading configuration information in the control command, configuring the system-on-chip based on the configuration information and updating a computer program stored in non-volatile memory and executable by the microprocessor core. The environmental state described herein may be described, for example, by one or more of the following parameters: temperature, humidity, light intensity, electric field intensity, magnetic field intensity, sound pressure, presence of smoke, particulate matter concentration, and carbon dioxide concentration. The configuration information described herein may be used, for example, to set an operating mode or operating parameters of one or more units within the system-on-chip 10 (e.g., to activate or deactivate general-purpose input/output ports and to adjust clock signal frequencies, etc.).

Referring to FIG. 1, the microprocessor core 110 may utilize the communication interface 101 to send the signal frame TX to the external device via the external bus BUS_1.

The analog signal processing unit 104 may include an analog front end (AFE) and an analog-to-digital converter (ADC) that converts an analog signal from a sensor SEN to a digital signal. The converted digital signal may be stored in the random-access memory 107 and/or the non-volatile memory 109 for recall by the microprocessor core 110. The sensor described herein may be, for example, one or more of the following: a temperature sensor, a humidity sensor, a photosensitive sensor, a Hall sensor, a gas sensor, a particulate matter counter, an acoustic sensor, a pressure sensor, a flow sensor, and an image sensor, and so on.

The watchdog timer 105 is configured to monitor an operating condition of the system-on-chip 10. The clock signal generator 106 is configured to provide clock synchronization signals to other units within the system-on-chip 10.

Figure 2:
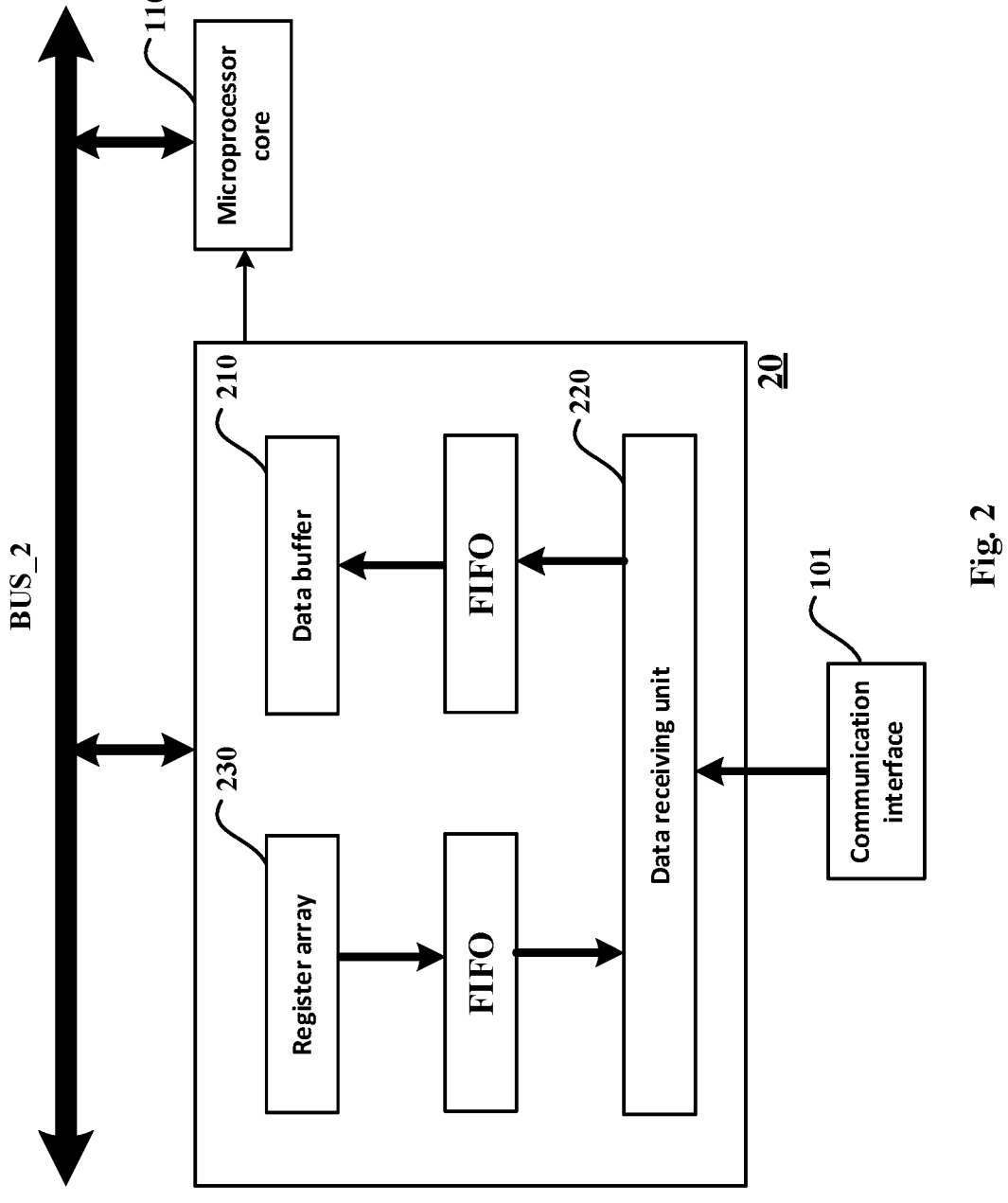
FIG. 2 is a schematic diagram of an architecture of a hardware decoder in accordance with some other embodiments of the present application.

FIG. 2 is a schematic diagram of an architecture of a hardware decoder in accordance with some other embodiments of the present application. A hardware decoder 20 shown in FIG. 2 may be used to implement the hardware decoder 102 of FIG. 1, which includes a data buffer 210, a data receiving unit 220, and a register array 230.

Referring to FIG. 2, the data receiving unit 220 is connected with a communication interface (e.g., communication interface 101 in FIG. 1) and the data buffer 210, the data buffer 210 is connected with a microprocessor core (e.g., microprocessor core 110 in FIG. 1) via an internal bus BUS_2. In some embodiments, the data receiving unit 220 receives a signal frame RX from the external bus BUS_1 via the communication interface 101, extracts a receiver address and a control command from the signal frame RX, and, upon determining that a receiver of the signal frame RX is a local device (e.g., the system-on-chip 10), on the one hand, stores data (e.g., control command) of the signal frame RX to the data buffer 210, and on the other hand, sends an interrupt signal INT to the microprocessor core 110 to instruct the microprocessor core 110 to read the data stored in the data buffer 210.

As shown in FIG. 2, the register array 230 is connected with the data receiving unit 220 and with the microprocessor core 110 via the internal bus BUS_2. At runtime, the register array 230 performs a configuration operation on the data receiving unit 220 in accordance with configuration information from the microprocessor core 110, such as updating parameters for parsing the signal frame and the like.

Optionally, the data receiving unit 220 stores the data of the signal frame RX to the data buffer 210 in the order of a first-in-first-out queue (FIFO), and the register array 230 outputs the configuration information from the microprocessor core 110 to the data receiving unit 220 in the order of a first-in-first-out queue. By providing a FIFO mechanism between the data buffer 210 and the data receiving unit 220 and between the register array 230 and the data receiving unit 220, a communication between different clock domains (internal bus and external bus) can be realized.

Figure 3:
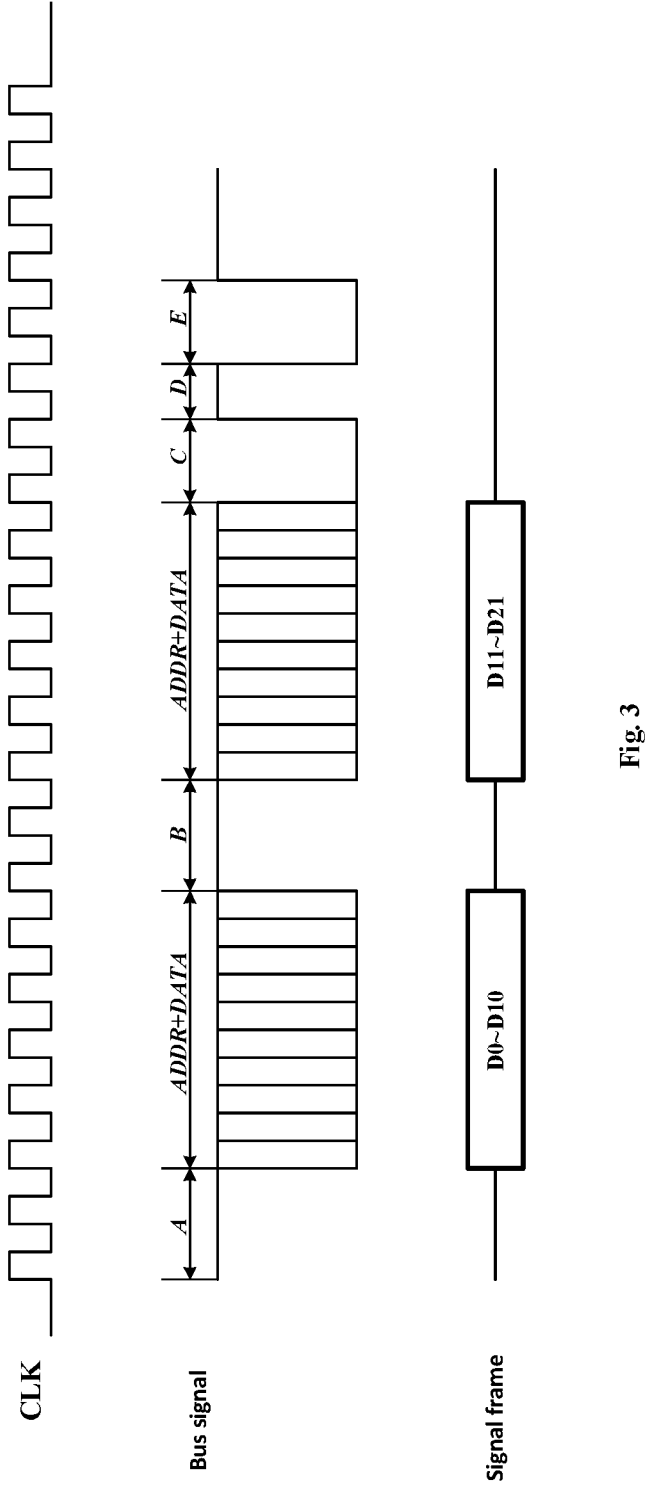
FIG. 3 is a schematic diagram of a hardware decoder performing a parsing operation on a signal frame RX, in accordance with some other embodiments of the present application.

FIG. 3 is a schematic diagram of a hardware decoder performing a parsing operation on a signal frame RX, in accordance with some other embodiments of the present application. An upper portion of FIG. 3 shows a clock signal CLK (e.g., a clock signal generated by the clock signal generator in FIG. 1), a middle portion shows a bus signal received from the external bus BUS_1, and a lower portion shows a signal frame parsed from the bus signal by the hardware decoder 102 or the data receiving unit 220. Referring to FIG. 3, each signal frame contains a receiver address ADDR and a data field DATA containing a control command.

Figure 4:
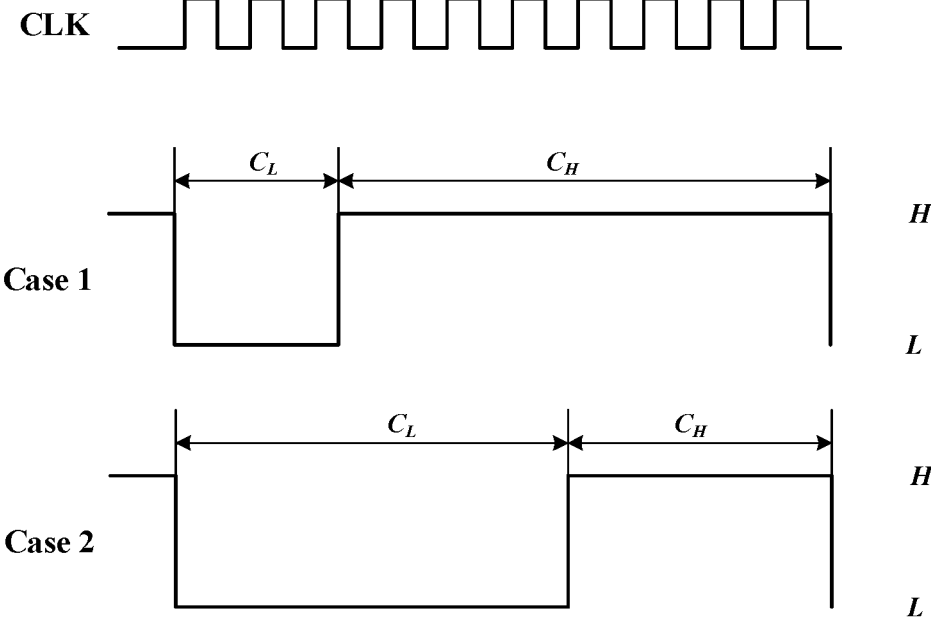
FIG. 4 is a schematic diagram of a hardware decoder performing a parsing operation on a signal frame RX, in accordance with some other embodiments of the present application.

FIG. 4 is a schematic diagram of a hardware decoder performing a parsing operation on a signal frame RX, in accordance with some other embodiments of the present application. The operation shown in FIG. 4 may be used to determine a logical value of a data bit. Specifically, in the example of FIG. 4, each data bit corresponds to a time length T comprising a prescribed number of clock cycles (e.g., 10 clock cycles), and if a duration of a high level H of the bus signal is greater than or equal to a duration of a low level L within the time length T, it is determined that the logical value of the data bit is '1' (e.g., Case 1 in FIG. 4), otherwise, it is determined that the logical value of the data bit is '0' (e.g., Case 2 in FIG. 4). Exemplarily, two counters may be utilized to count the number CH of clock cycles in which the bus signal is in a high level state and the number CL of clock cycles in which the bus signal is in a low level state within the time length T and determine the logical value of the data bit by comparing the counted values.

Figure 5:
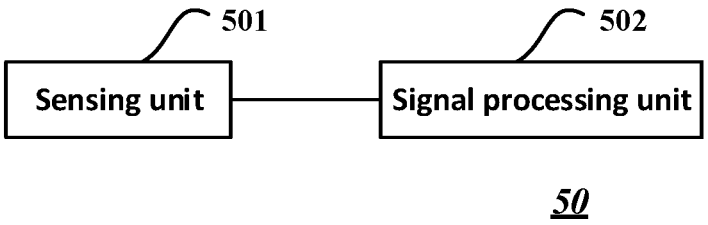
FIG. 5 is a schematic block diagram of an environmental monitoring device in accordance with some other embodiments of the present application.

FIG. 5 is a schematic block diagram of an environmental monitoring device in accordance with some other embodiments of the present application.

An environmental monitoring device shown in FIG. 5 may be a device that monitors a variety of environmental states, which include, for example, but are not limited to, a smoke detection device, a heat detection device, a decibel meter, an electric/magnetic field detection device, a light intensity detection device, and so on.

Referring to FIG. 5, the environmental monitoring device 50 comprises a sensing unit 501 and a signal processing unit 502. The sensing unit 501 comprises a sensor to sense or acquire an environmental state, and the sensor may be, for example, one or more of the following: a temperature sensor, a humidity sensor, a photosensitive sensor, a Hall sensor, a gas sensor, a particulate matter counter, an acoustic sensor, a pressure sensor, a flow sensor, and an image sensor, and so on. The signal processing unit 502 is configured to process a signal of an environmental state acquired by the sensing unit 501 and output the signal as processed to an external device, and to perform various operations based on a control command of the external device, such as acquiring the signal of the environmental state from the sensing unit 501, generating data about the environmental state, sending a message containing the data about the environmental state to the external device, updating the configuration information of the signal processing unit, and upgrading a computer program running within the signal processing unit. The signal processing unit 502 can be realized using the system-on-chip described above with the aid of FIGS. 1-4.

Figure 6:
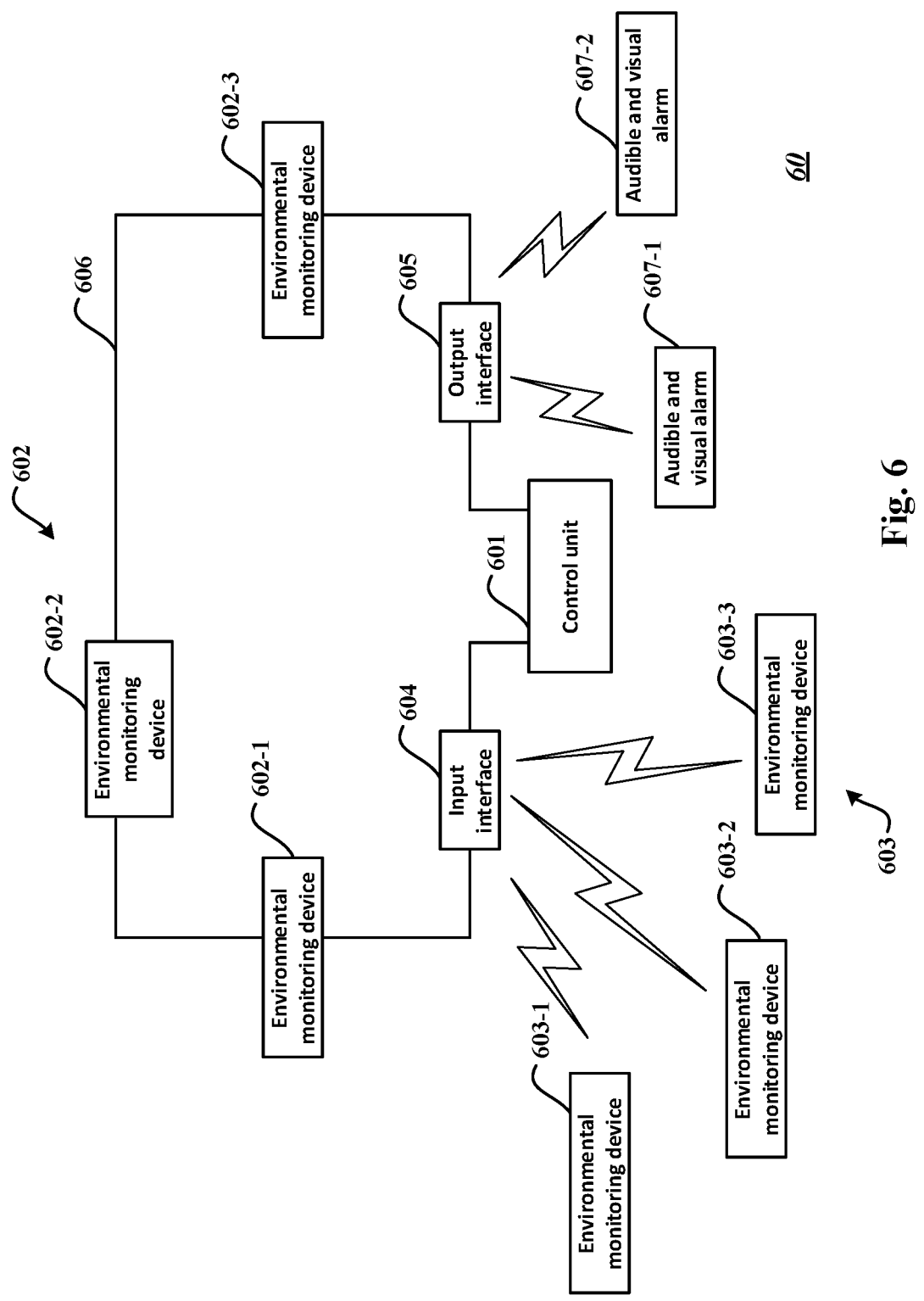
FIG. 6 is a schematic diagram of a control system in accordance with some other embodiments of the present application.

FIG. 6 is a schematic diagram of a control system in accordance with some other embodiments of the present application.

A control system 60 shown in FIG. 6 comprises a control unit 601, a first group of environmental monitoring devices 602, a second group of environmental monitoring devices 603, an input interface 604, and an output interface 605. The first group of environmental monitoring devices 602 comprises a plurality of environmental monitoring devices 602-1 to 602-3, which establish a communication connection with the control unit 601 via an external bus 606 (e.g., a two-wire fire bus). The second group of environmental monitoring devices 603 comprises a plurality of environmental monitoring devices 603-1 to 603-2, which may communicate with the control unit 601 wirelessly, via the input interface 604. Various features relating to the environmental monitoring devices have been described with reference to FIG. 5 and will not be repeated herein.

Referring to FIG. 6, the control system 60 also includes a plurality of audible and visual alarms 607-1 and 607-2. These audible and visual alarms may communicate with the control unit 601 wirelessly, via the output interface 605.

In the embodiment shown in FIG. 6, the environmental monitoring device may be one or more of the following devices: a smoke detection device, a heat detection device, a decibel meter, an electric/magnetic field detection device, a multifunction sensor, a light intensity detection device, and so on.

When the control system 60 is in an operational state, the control unit 601 receives a message about an environmental state from the environmental monitoring devices in the first group of environmental monitoring devices 602 and the second group of environmental monitoring devices 603, and performs a corresponding operation based on the received message. In one example, when the control unit 601 determines that a fire has occurred based on a smoke alarm message received from a smoke alarm and an on-site image/audio signal, it will instruct the audible and visual alarms to play an alarm signal via the output interface 505.

It should be noted that the number of units shown in FIG. 6 is merely exemplary and does not constitute a limitation on the scope of disclosure of the present application.

In the embodiment shown in FIG. 6, since hardware decoder-based methodology is utilized to process the received signal frames, the data throughput capability is improved, thereby enabling high-speed data communication between the system-on-chip and an external device (e.g., a control panel), which is urgently needed for many application scenarios. For example, in an application instance, when a smoke alarm sends an alarm message to a control panel, the control panel may need to retrieve on-site video images and/or audio signals for further confirmation in order to avoid false alarms. Hardware decoding method can provide transmission rate of up to 100 Kb/s on an external bus such as a 2-wire fire bus, thus allowing image data frames or audio data frames to be transmitted to the control panel via the external bus, avoiding the need to deploy additional high-speed communication cables.

Those skilled in the art will appreciate that the various illustrative logical blocks, modules, circuits, and algorithm steps described herein may be implemented as electronic hardware, computer software, or combinations of both.

To demonstrate this interchangeability between hardware and software, various illustrative components, blocks, modules, circuits, and steps have been described above generally in terms of their functionality. Whether such functionality is implemented in hardware or software depends on the particular application and design constraints imposed on the overall system. Those skilled in the art may implement the described functionality in changing ways for the particular application. However, such implementation decisions should not be interpreted as causing a departure from the scope of the present application.

Although only a few of the specific embodiments of the present application have been described, those skilled in the art will appreciate that the present application may be embodied in many other forms without departing from the spirit and scope thereof. Accordingly, the examples and implementations presented are to be regarded as illustrative and not restrictive, and various modifications and substitutions may be covered by the application without departing from the spirit and scope of the application as defined by the appended claims.

The embodiments and examples presented herein are provided to best illustrate embodiments in accordance with the present technology and its particular application, and to thereby enable those skilled in the art to implement and use the present application. However, those skilled in the art will appreciate that the above description and examples are provided for convenience of illustration and example only. The presented description is not intended to cover every aspect of the application or to limit the application to the precise form disclosed.

The invention claimed is:

1. A control system, comprising:
an environmental monitoring device; and
a control unit connected with the environmental monitoring device via an external bus,
wherein the external bus comprises a two-wire bus;
wherein the environmental monitoring device comprises:
    a sensing unit configured to acquire an environmental state; and
    a system-on-chip including:
        a communication interface connected with the external bus;
        a hardware decoder connected with the communication interface; and
        a microprocessor core connected with the communication interface and the hardware decoder,
        wherein the hardware decoder is configured to receive, via the communication interface, a signal frame transmitted on the external bus, to extract a receiver address from the signal frame as received and to send a wake-up command to the microprocessor core upon determining that the receiver address of the signal frame identifies the system-on-chip;
        wherein the microprocessor core is configured to remain in a sleep mode until the wake-up command is received, and to perform an operation specified by a control command contained in the signal frame in response to the wake-up command;
        wherein the wake-up command is received on an external bus from an external device.

2. The control system of claim 1, wherein the microprocessor core is further configured to enter a sleep mode again after completing the operation specified by the control command.

3. The control system of claim 1, wherein the wake-up command is an interrupt signal sent to the microprocessor core by the hardware decoder.

4. The control system of claim 3, wherein the microprocessor core is configured to access the hardware decoder in response to the interrupt signal to read the control command in the signal frame.

5. The control system of claim 4, wherein the hardware decoder comprises:
a data buffer connected with the microprocessor core via an internal bus;

a data receiving unit connected with the communication interface and the data buffer, the data receiving unit is configured to receive the signal frame from the external bus and, upon determining that a receiver of the signal frame is the system-on-chip, on the one hand store data of the signal frame to the data buffer and, on the other hand, send the interrupt signal to the microprocessor core to instruct the microprocessor core to read the data stored in the data buffer.

6. The control system of claim 5, wherein the hardware decoder further comprises a register array connected with the data receiving unit and connected with the microprocessor core via the internal bus, the register array is configured to perform a configuration operation on the data receiving unit in accordance with configuration information from the microprocessor core.

7. The control system of claim 5, wherein the data receiving unit is configured to store the data of the signal frame to the data buffer in the order of a first-in-first-out queue, and the register array outputs the configuration information from the microprocessor core to the data receiving unit in the order of a first-in-first-out queue.

8. The control system of claim 1, wherein the specified operation comprises at least one of the following: generating a message about an environmental state,
reading configuration information in the control command, configuring the system-on-chip based on the configuration information and updating a computer program executed by the microprocessor core.

9. The control system of claim 1, wherein the environmental monitoring device is one of the following: a smoke detection device, a heat detection device, a decibel meter, an electric/magnetic field detection device, a multifunction sensor, and a light intensity detection device.

10. The control system of claim 1, wherein the environmental monitoring device sends to the control unit over the external bus an image data frame or an audio data frame about an environmental state.

\* \* \* \* \*